Patented Apr. 6, 1937

2,075,885

UNITED STATES PATENT OFFICE 2,075,885

SEALING COMPOUND

George R. Carlson, Newark, and Robert J. Stoetzel, Union, N. J., assignors to Western Electric Company, Incorporated, New York, N. Y., a corporation of New York No Drawing. Application March 4, 1936
Serial No. 67,072

4 Claims. (Cl. 106—8)

This invention relates to a sealing compound and particularly to a compound for use in sealing electrical devices into protective containers.

In the manufacture of certain electrical devices, e. g. condensers, coils, transformers, and the like, it is found to be desirable to enclose each such device in a casing of metal or of non-conductive material for mechanical, or electrical, or weatherproofing protection, and to seal the device into such casing by pouring into the casing and around the device a quantity of a suitable, molten, congealable compound, which is then allowed to set.

An object of the present invention is to provide a compound for the above described purpose which shall not only have suitable properties when set, but which shall wet the solids, metallic and other, of which the device and its casing or container are constructed, and so shall largely obviate difficulties due to occluded air and unfilled spaces in the finished article, and shall also render the compound less subject to shrinking while setting and to cracking when set.

The invention, in one embodiment thereof, contemplates the addition of a proportion of esters of abietic acid and in particular a mixture of the methyl esters of several isomeric forms of abietic acid to a compound of gum rosin and hydrated lime, for use in sealing electrical devices.

Other objects and characteristic features of the invention will appear from the following detailed description of one embodiment thereof. In the manufacture of some forms of relatively small electrical coils used in a large variety of ways as for example, in radio, in telephone apparatus and the like branches of the electrical arts, it is customary to install the wound and completed coil in a metal container and to pour therein enough of a suitable compound to fill all the space or spaces in the container not occupied by the coil, its leads, supports and other appurtenances. This operation of pouring in molten compound and allowing it to set is ordinarily termed "potting" the coil, and the compound is known as "potting compound".

In accordance with the invention it is found that an improved potting compound may be prepared by melting 200 lbs. of gum rosin in a kettle. When the rosin is melted it is stirred constantly while 10 lbs. of hydrated lime are added gradually, stirred in and thoroughly mixed. Preferably the molten rosin is held at a temperature of 500°–520° F. while the lime is being added and when the lime is all in, the mixture is raised to 520°–530° F. and stirred constantly at that temperature for twenty minutes.

When the mixture of lime and rosin has been accomplished, the temperature is reduced to 300° F. and about 12 lbs. of a mixture of methyl abietates is added and stirred in. The mixture is then allowed to cool in pans and the solidified cakes stored. It is remelted for use in such quantity as desired at any one time.

It is found that the addition of the abietic esters improves notably the wetting power of the molten compound and so decreases largely the tendency for air to be entrapped during the potting process. It also reduces the shrinking of the compound while solidifying and reduces its brittleness when set.

The preferred mixture of abietic esters is a commercially obtainable product in the form of a viscous, pale-yellow liquid of which about 95% has the chemical formula $C_{19}H_{29}COO.CH_3$ and a specific gravity of the order of 1.036.

The proportions and the method of preparation above disclosed are a preferred form, but may be modified and departed from in various ways without departing from the spirit and scope of the invention as pointed out in and limited solely by the appended claims.

What is claimed is:

1. A sealing compound comprising about 200 parts by weight of rosin, about 10 parts by weight of hydrated lime, and about 12 parts by weight of abietic esters.

2. A sealing compound comprising about 200 parts by weight of rosin, about 10 parts by weight of hydrated lime, and about 12 parts by weight of methyl esters of isomeric abietic acids.

3. The method of making a sealing compound which comprises the steps of melting about 200 parts by weight of rosin, stirring about 10 parts by weight of hydrated lime into the molten rosin, and stirring about 12 parts by weight of methyl esters of abietic acids into the molten lime-rosin mixture.

4. The method of making a sealing compound which comprises the steps of melting about 200 parts by weight of rosin at about 510° F., stirring about 10 parts by weight of hydrated lime in the molten rosin, stirring the molten lime-rosin mixture for about 20 minutes at about 520° F., and stirring about 12 parts by weight of methyl esters of abietic acids into the molten lime-rosin mixture at about 300° F.

GEORGE R. CARLSON.
ROBERT J. STOETZEL.